US012614050B2

(12) United States Patent
Salles et al.

(10) Patent No.: US 12,614,050 B2
(45) Date of Patent: Apr. 28, 2026

(54) METHOD FOR MANAGING A CARD

(71) Applicant: THALES DIS FRANCE SAS, Meudon (FR)

(72) Inventors: Jean-Luc Salles, La Bouilladisse (FR); Laurent Leloup, Peypin (FR); Nicolas Boulanger, Meyreuil (FR); Pierre Souchon, Ceyreste (FR); Guillaume Cammas, Aubagne (FR); Pierre Paladjian, Allauch (FR)

(73) Assignee: THALES DIS FRANCE SAS, Meudon (FR)

( * ) Notice: Subject to any disclaimer, the term of this patent is extended or adjusted under 35 U.S.C. 154(b) by 0 days.

(21) Appl. No.: 18/712,309

(22) PCT Filed: Nov. 14, 2022

(86) PCT No.: PCT/EP2022/081809
§ 371 (c)(1),
(2) Date: May 22, 2024

(87) PCT Pub. No.: WO2023/094200
PCT Pub. Date: Jun. 1, 2023

(65) Prior Publication Data
US 2025/0013847 A1     Jan. 9, 2025

(30) Foreign Application Priority Data
Nov. 24, 2021    (EP) .................................... 21306634

(51) Int. Cl.
*G06K 19/07*          (2006.01)
(52) U.S. Cl.
CPC ................................ *G06K 19/0718* (2013.01)

(58) Field of Classification Search
None
See application file for complete search history.

(56) References Cited

U.S. PATENT DOCUMENTS

| | | | | |
|---|---|---|---|---|
| 5,072,103 A | * | 12/1991 | Nara ...................... | G06K 19/07 |
| | | | | 235/487 |
| 8,690,055 B2 | * | 4/2014 | Anderson ........... | G06Q 20/383 |
| | | | | 235/379 |

(Continued)

FOREIGN PATENT DOCUMENTS

| | | |
|---|---|---|
| CN | 108364388 A | 8/2018 |
| EP | 3657368 A1 | 5/2020 |

(Continued)

OTHER PUBLICATIONS

International Search Report (PCT/ISA/210) and Written Opinion (PCT/ISA/237) mailed on Feb. 22, 2023, by the European Patent Office as the International Searching Authority for current International Application No. PCT/EP2022/081809—[14 pages].

*Primary Examiner* — Thien M Le
*Assistant Examiner* — April A Taylor

(57) ABSTRACT

Provided is a method for managing a card comprising a user output interface. The method comprises a control operation of the card for getting, by the card, a parameter which can evolve dynamically during card lifespan, generating, by the card, a decision which may be positive or negative by executing a preset function applied to said parameter, and, only if said decision is positive, identifying, by the card, a message and notifying a user of the card directly through the user output interface that the card has the message to deliver to the user. Other embodiments disclosed.

11 Claims, 3 Drawing Sheets

(56) References Cited

U.S. PATENT DOCUMENTS

| 11,587,087 B2 * | 2/2023 | Chen ................. G06Q 20/3227 |
|---|---|---|
| 2017/0178115 A1 | 6/2017 | Todasco |
| 2017/0228722 A1 | 8/2017 | Szutkowski et al. |
| 2019/0139029 A1 | 5/2019 | Kadiwala et al. |
| 2021/0035109 A1 | 2/2021 | Wong et al. |

FOREIGN PATENT DOCUMENTS

| JP | 2012252666 A | 12/2012 | |
|---|---|---|---|
| JP | 2010128510 A | 12/2021 | |
| WO | WO-0188659 A2 * | 11/2001 | ....... G06K 19/06196 |

* cited by examiner

METHOD FOR MANAGING A CARD

FIELD OF THE INVENTION

The present invention relates to methods for managing a smart card. It relates particularly to methods of managing communication between a smart card and the cardholder.

BACKGROUND

Smart cards are portable small devices comprising a memory, a microprocessor and an operating system for computing treatments. They may comprise services applications like payment applications. Such secure elements may comprise a plurality of memories of different types, like non-volatile memory and volatile memory. They are considered as tamper-resistant (or "secure") because they are able to control the access to the data they contain and to authorize or not the use of data by other machines. A smartcard may also provide computation services based on embedded cryptographic components. In general, smartcards have limited computing resources and limited memory resources and they are intended to connect a host machine which provides them with electric power either in contact mode or contactless mode.

During a transaction, a terminal connected to a smart card may display a message according to the result of a treatment performed by the card. Some terminals may be designed to provide the cardholder with a message belonging to a list of predefined messages related to the transaction.

SUMMARY

When the card needs to present a different message (which may be not directly linked to the transaction) to the user, an issue may occur. There is a need to enhance the mechanism in charge of managing communication between a smart card and the cardholder.

The invention aims at solving the above-mentioned technical problem.

An object of the present invention is a method for managing a card that comprises a user output interface. The method comprises a control operation of the card including the steps of:

Getting, by the card, a parameter which can evolve dynamically during card lifespan;

Generating, by the card, a decision which may be positive or negative by executing a preset function applied to the parameter; and Only if said decision is positive, identifying, by the card, a message and notifying a user of the card directly through said user output interface that the card has the message to deliver to the user.

Advantageously, the card may connect a terminal comprising a man machine interface and the terminal may retrieve an identifier of the message from the card and present the message to the user through the man machine interface.

Advantageously, the card may comprise a fingerprint sensor, the parameter may be an indicator reflecting a level of dirt of the fingerprint sensor, the card may generate the indicator from a captured data acquired by the fingerprint sensor and the message may indicate the user that the fingerprint sensor should be cleaned.

Advantageously, the card may record the indicator and the fingerprint sensor may acquire a new captured data. The card may compute a new indicator reflecting a new level of dirt of the fingerprint sensor from the new captured data and the card may generate a new decision that may be positive or negative by executing said preset function applied to both said indicator and said new indicator. Only if said new decision is positive, the card may identify a new message and notify the user directly through said user output interface that the card has a new message to deliver to the user.

Advantageously, the card may comprise a biometric reference pattern and the indicator may be generated each time a comparison between an image extracted from said captured data and the biometric reference pattern fails.

Advantageously, the control operation may be executed at each power-up of the card or may be randomly triggered.

Advantageously, the card may be a payment card and the control operation may be performed each time a payment transaction occurs.

Advantageously, the user output interface may be a light source (e.g. LED), a sound generator, a display or a pictogram illuminated by an associated light source.

Another object of the present invention is a card comprising a user output interface, a processor and instructions that cause said card to execute a control operation in which:

The card gets a parameter having a value that can evolve dynamically during card lifespan;

The card generates a decision which may be positive or negative by executing a preset function applied to said parameter; and Only if said decision is positive, the card identifies a message and notifies a user of the card directly through said user output interface that the card has the message to deliver to the user.

Advantageously, the card may be configured to send an identifier of said message to a terminal connected to the card.

Advantageously, the card may comprise a fingerprint sensor, said parameter may be an indicator reflecting a level of dirt of the fingerprint sensor, the card may be configured to generate the indicator from a captured data acquired by the fingerprint sensor and the message may indicate the user that the fingerprint sensor should be cleaned.

Advantageously, the card may be configured to record the indicator and the fingerprint sensor may be able to acquire a new captured data. The card may be configured to compute a new indicator reflecting a new level of dirt of the fingerprint sensor from the new captured data and the card may be configured to generate a new decision which may be positive or negative by executing said preset function applied to both said indicator and said new indicator. Only if said new decision is positive, the card may be configured to identify a new message and to notify the user directly through said user output interface that the card has a new message to deliver to the user.

Advantageously, the card may comprise a biometric reference pattern and the card may be configured to generate the indicator each time a comparison between an image extracted from said captured data and the biometric reference pattern fails.

BRIEF DESCRIPTION OF THE DRAWINGS

Other characteristics and advantages of the present invention will emerge more clearly from a reading of the following description of number a of preferred embodiments of the invention with reference to the corresponding accompanying drawings in which.

3

Figure 2:
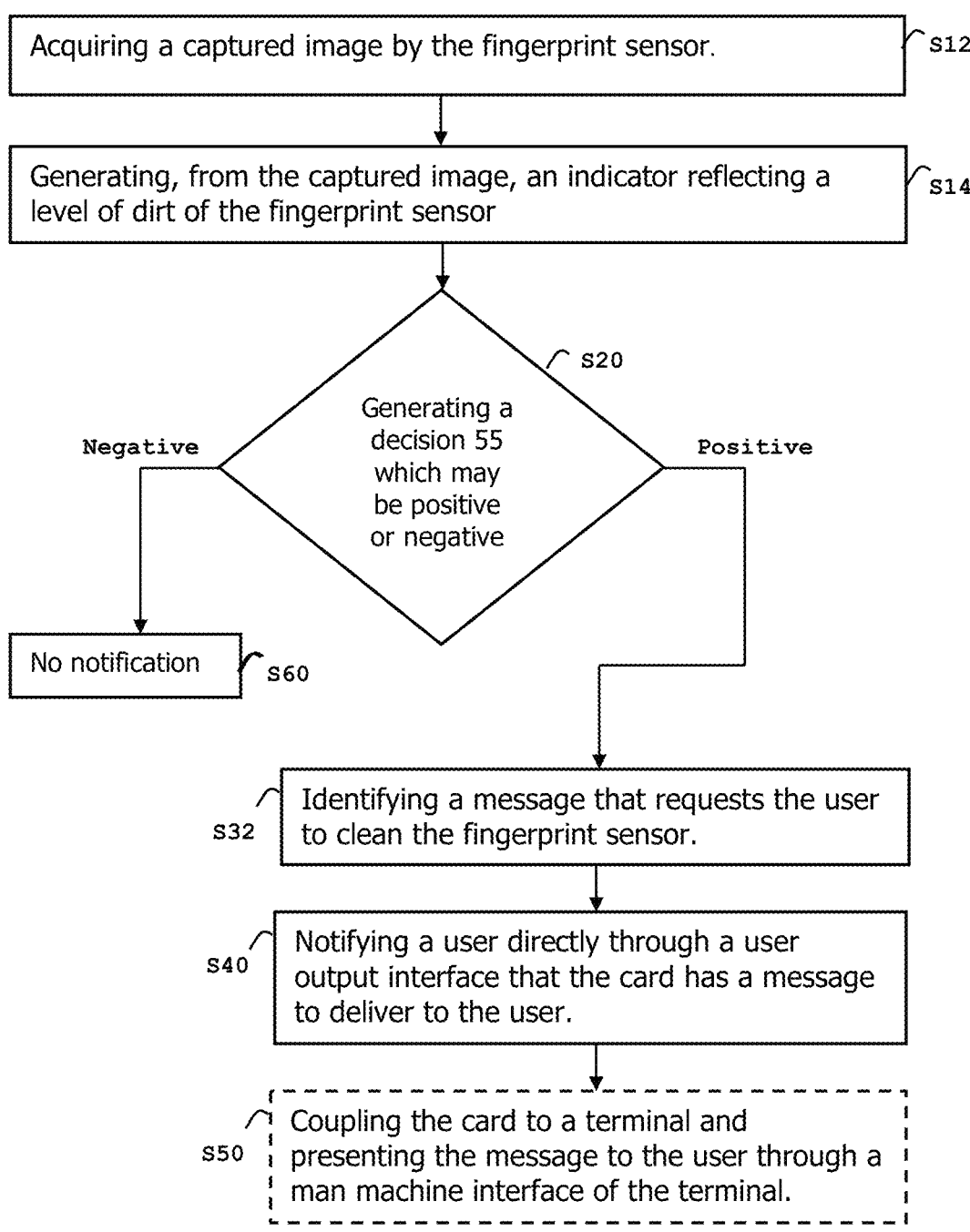
Figure 3:
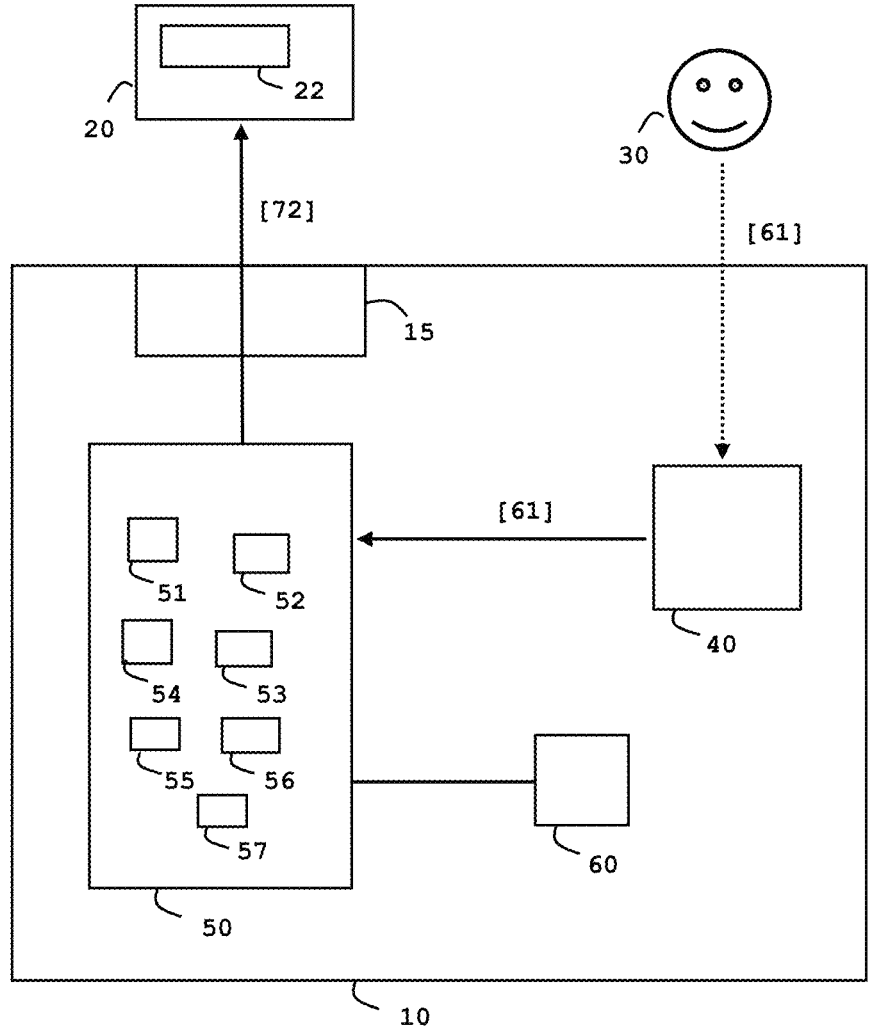

FIG. 2 shows a second exemplary flow diagram for managing a smart card embedding a biometric sensor according to an example of the invention; and FIG. 3 shows a diagram of architecture of a smart card according to an example of the invention.

DETAILED DESCRIPTION

The invention may apply to any type of smart card embedding a user output interface which is different from the card communication interface allowing the card to communicate with another hardware machine like a card reader. In this document, the user output interface allows the card to directly provide the cardholder with an information.

The card may be a banking card, a ticket providing access to a mass transit, an access badge or an identity document for instance.

The invention is well-suited for cards which are designed to communicate through at least one contactless protocol. The invention also applies to cards which are designed to communicate through a contact protocol only or through both contact and contactless protocols.

Figure 1:
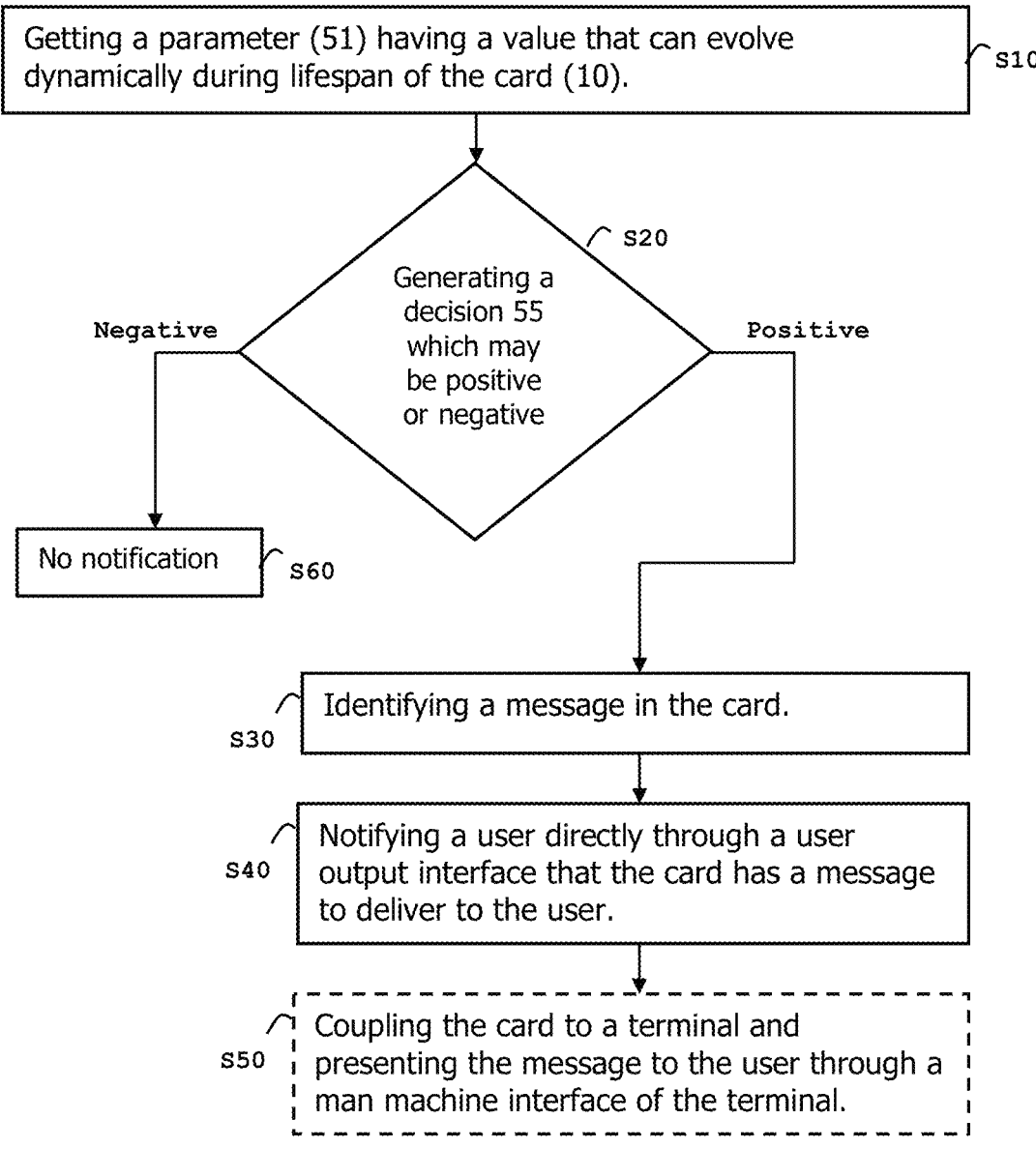
FIG. 1 shows a first exemplary flow diagram for managing a smart card according to an example of the invention.

FIG. 1 depicts a first exemplary flow diagram for managing a card according to an example of the invention.

In this example, the card 10 is a banking smart card intended to be used by its associated user (i.e. bank customer) for payment or cash withdrawal.

The method comprises a control operation of the card. As shown at FIG. 1, the control operation may include the steps described below.

At step S10, the card 10 gets a parameter 51 whose value can change dynamically during the card lifespan. This parameter may be a parameter (or a variable) internal to the card or specific to a hardware (or software) component embedded in the card. For instance, the parameter may be a counter stored in a memory of the card or a physical characteristic of a hardware component of the card which is measured by the card itself.

At step S20, the card 10 generates a decision 55 which may be positive or negative by executing a preset function applied to the parameter 51. The preset function may be a comparison function which checks if the parameter is above a predefined threshold or belongs to a preset range. For instance the decision may be positive only if the parameter is below a predefined threshold.

If the decision is negative at end of step S20, the card may not notify the user (step S60) or notify the user that there is no message to get from the card.

At step S30, only if the decision is positive, the card identifies a message 52, then at step S40, the card notifies the cardholder (i.e. the user of the card) directly through the user output interface that the card has the message 52 to deliver to the cardholder.

For example, the identified message 52 may be "The number of transactions performed by the card is near the maximum authorized number, please contact your bank."

Due to physical and cost constraints, the user output interface embedded in the card may be limited and not allow the transmission of such a long (or complex) message. However, the user output interface may transmit to the cardholder a piece of information reflecting the fact that the card has a message (i.e. the identified message 52) to deliver to the cardholder. The user output interface may be a LED, which, when it lights up, indicates the availability of a message to be retrieved from the card.

The user output interface may be a light source, a sound generator, a display or a pictogram illuminated by an associated light source.

At step S50, the cardholder may connect the card 10 to a terminal equipped with a man machine interface so as to get the message 52 through this man machine interface. For example, the user may couple the card 10 to a smartphone (via a NFC or Bluetooth connection for instance) and activate a mobile application which retrieves the message from the card (vie a NDEF message for instance) and displays this message through the screen of the smartphone. The user may also connect the card to a card reader equipped with a screen or a speaker to get access to the content of the message 52.

The terminal may retrieve an identifier 72 of the message 52 from the card 10 and present the message to the user through the man machine interface accordingly. The identifier 72 may be the content of the message or an index of the message provided that the message has been preregistered in the terminal.

The control operation may be done according to different policies. For example, the control operation may be done at each power-up of the card or may be randomly triggered. When the card is a payment card, the control operation may be done each time a payment transaction occurs.

It is to be noted that when the decision generated by the card is positive, the card emits two separate pieces of information linked to each other (i.e. the direct notification of existence of a message to be retrieved and the reference 72 of the message) through two distinct communication interfaces of the card (i.e. the user output interface 60 and the communication interface 15).

It should be noted that the card 10 may be coupled to a first hardware device during step S10 (time of identification of the parameter 51) then coupled to another hardware device (i.e. separate from the first hardware device) for retrieving the message 52 during step S50. Thus steps S10 and S50 may be several minutes, hours or days apart.

FIG. 2 depicts a second exemplary flow diagram for managing a smart card embedding a biometric sensor according to an example of the invention.

The card 10 embeds a biometric sensor 40 designed to capture fingerprint data. The smartcard may embed a secure element coupled to the biometric sensor and configured to act as a controller of the biometric sensor. The secure element may be adapted to get data captured by the sensor and to apply treatments on the captured data. For instance, the secure element may be configured to perform an anti-spoofing algorithm to detect fraud attempts based on a fake fingerprint system. The secure element comprises a hardware processing unit, memory and an operating system designed to contribute to applicative services. The smart card may comprise a reference biometric data which has been enrolled by the card user.

The method comprises a control operation of the card. As shown at FIG. 2, the control operation may include the steps described below.

At step S12, the fingerprint sensor acquires an image of a finger presented to the fingerprint sensor. The acquired image is also called captured image.

At step S14, the card 10 gets a parameter whose value can change dynamically during the card lifespan. In the example of FIG. 2, the parameter is an indicator reflecting a level of dirt of the fingerprint sensor. The card may generate the indicator from the captured image (raw data) or from biometric data extracted from the captured image.

In some embodiments, the card may generate the dirt indicator by detecting the presence of artifacts/items placed at a fixed position on a series or sequence of images captured by the biometric sensor. For example, the card may locate an area where the contrast is often or always different from the rest of the captured image or locate a particular element that is regularly presents in a particular area of the captured images.

In some embodiments, the card may generate the dirt indicator by monitoring the image quality of an image captured by the biometric sensor. The contrast or the brightness of the captured image are quality characteristics that may be analyzed to monitor the image quality.

In some embodiments, the card may generate the dirt indicator by considering the sensor is dirty as the result of a sequence of a preset number (e.g. four or five) consecutive failing match operations.

At step S20, the card 10 generates a decision 55 that may be positive or negative by executing a preset function 56 applied to the indicator. The preset function may be comparison function which checks if the indicator is above a predefined threshold or belongs to a preset range of values. For instance the decision may be positive only if the indicator is above a predefined threshold.

If the decision is negative at end of step S20, the card may not notify the user (step S60) or notify the user that there is no message to get from the card.

At step S32, only if the decision is positive, the card identifies a message that request the user to clean the fingerprint sensor.

Then, the card notifies the cardholder (i.e. the user of the card) directly through the user output interface that the card has the message to deliver to the cardholder at the step S40.

For example, the identified message may be "Please clean the fingerprint sensor of your card" or "The fingerprint sensor of your card is dirty."

The user output interface may be a Light-Emitting Diode (LED), which, when it lights up, indicates the availability of a message to be retrieved from the card. For instance a blinking red LED (or a particular sequence of light signals) may inform the user of the availability of a message to be retrieved from the card.

At step S50, the cardholder may connect the card 10 to a terminal equipped with a man machine interface so as to get, through this man machine interface, the message that has been identified by the card. For example, the user may couple the card 10 to a portable card reader comprising a screen and designed to retrieve a reference of the message from the card and to present the message to the user. When the card is banking card, the user may decide to connect the card to an automated teller machine (ATM) designed to retrieve the identifier (i.e. the message itself or an index of the message) of the message from the card 10 and to present the relevant message to the cardholder.

The control operation may be done according to a preset policy. For example, when the card is a payment card, the control operation may be done each time a payment transaction occurs. In another example, assuming the card comprises a pre-registered biometric reference pattern 54 (enrolled in a previous stage the card may generate a dirt indicator each time a comparison between data extracted from image captured by the fingerprint sensor and the biometric reference pattern fails.

FIG. 3 depicts a diagram of architecture of a card according to an example of the invention.

In this example, the card 10 is a biometric smart card allocated to a user 30.

The biometric card 10 comprises a secure chip 50 (also called secure element) and a fingerprint sensor 40 connected to the secure chip. The smart card 10 comprises a communication interface 15 which is designed to exchange data with outside in contactless mode. The communication interface 15 is linked to the secure element 50.

The secure chip 50 comprises a processor and a non-volatile memory (not shown). The non-volatile memory stores an operating system which includes software instructions that are executed by the processor to perform the features of the secure chip.

In the example of FIG. 3, the card 10 is coupled to a reader 20 which may be embedded in an applicative apparatus (like a Point-Of-Sale device or gate for access control for example) and the secure element 50 is a conventional smart card chip with additional features. The secure element 50 is able to contribute to an applicative transaction with an external machine. For instance, the transaction may be a payment transaction or cash withdrawal if the card is a banking card.

The secure element 50 may comprise a biometric reference pattern 54 previously enrolled by the user 30.

The secure element 50 may comprise a biometric algorithm (matching algorithm) aiming at comparing the biometric reference pattern 54 with biometric data captured by the sensor 40.

The card is configured to get a parameter 51 having a value which can evolve dynamically during the card lifespan. The parameter may be an internal variable or a physical characteristic measured by the card. For example, the parameter 51 may be a physical characteristic of a hardware component embedded in the card.

The parameter 51 may be a physical characteristic measured by the card. For example, the parameter 51 may be the power level retrieved by the card from a connected card reader, or the internal current consumption during a particular treatment.

The secure element comprises a preset function 56 configured to generate a decision which may be positive or negative. The preset function 56 may be designed to compare the value of a data with a preset reference that may be a threshold or a range of values.

The preset function 56 may be designed to detect the presence of specific items in an image captured by the fingerprint sensor. The preset function 56 may be adapted to detect the presence of specific items located in a particular area of the captured image.

The card 10 comprises a user output interface 60 which may be a light source (like a LED), a sound generator (e.g. buzzer), a small display or a pictogram intended to be illuminated by an associated internal light source.

In some embodiments, the smartcard 10 may embed a controller (not shown at FIG. 3) coupled to both the secure element and the biometric sensor and which is configured to get data captured by the sensor and to apply treatments on the captured data. For instance, the controller may be a microcontroller unit (MCU) which is configured to perform an anti-spoofing algorithm.

The card is adapted to generate a decision 55 that may be positive or negative by executing a preset function applied to the parameter 51.

In response to a positive decision generation (i.e. only if the generated decision is positive), the card is configured to identify a message 52 and to notify the user 30 directly through the user output interface 60 that the card has the message 52 to deliver to the user.

The card may be configured to send an identifier 72 of the message 52 to a connected terminal only if a message is to be delivered to the user (cardholder). The card may record a track 57 of the existence of the need to deliver the message 52 to the user and delete this track when the card has sent a reference of the message to the connected terminal or when the connected terminal informs the card that the message 52 has been presented to the user.

In some embodiments, the parameter 52 is an indicator reflecting a level of dirt of the fingerprint sensor 40. The card is configured to generate the indicator from a captured data 61 acquired by the fingerprint sensor. The message 52 indicates the user that the fingerprint sensor should be cleaned.

It is to be noted that the card may store a reference of the message (which may be coded on one or two digits for instance) and that the card does not need to store the entire text of the message.

In one embodiment, the card may be configured to perform the control operation each time a comparison between a data extracted from the captured image 61 and the biometric reference pattern 54 fails.

In some embodiments, the card may be configured to perform the control operation each time a predetermined number (ex: 4, 9 or 17) of transactions using the fingerprint sensor have been executed.

In some embodiments, the card may be a payment card configured to perform the control operation each time a payment transaction occurs.

In some embodiments, the card may be configured to store the indicator 51 and to compute a new indicator reflecting a new level of dirt of the fingerprint sensor from a new data captured by the fingerprint sensor. The card may be configured to generate a new decision which may be positive or negative by executing the preset function applied to both the stored indicator and the new indicator. Only if the new decision is positive, the card may be configured to identify a new message 53 and to notify the user directly through said user output interface that the card has a new message to deliver to the user. Thus by taking into account the measured quality of a previous extracted image, the card may be able to generate a positive decision based on the history. The card may be configured to select a threshold depending on a progressive degradation of the quality of the captured images. It should be noted that the indicator 51 may lead to a negative decision (generated by the preset function) while the new indicator (which is the next indicator) may lead to a positive decision.

As mentioned before, the card may be configured to record a track 57 of the existence of the need to deliver a message to the user. The card may be configured to store more than one track and to delete each track when the card has sent a reference of the corresponding message to the connected terminal or when the connected terminal informs the card that the corresponding message has been presented to the user.

Thanks to some embodiments of the invention, it is possible to dynamically warn the cardholder that the card has a long or complex message to deliver to them.

Thanks to some embodiments of the invention, the card may measure the level of dirt of its own biometric sensor and prompt the user to retrieve, via another device, a message that explains that the sensor should be cleaned. Thus failures to use card biometric sensor can be avoided or at least limited thanks to some embodiments of the invention.

Thanks to some embodiments of the invention, the card may dynamically monitor an internal critical parameter or a physical characteristic of an embedded hardware component and warn the cardholder of a corresponding corrective or preventive action.

The invention is not limited to the described embodiments or examples. In particular, the described examples and embodiments may be combined.

The invention is not limited to biometric smart cards and may apply to any smart cards allocated to a user.

The invention claimed is:

1. A method for managing a card comprising a user output interface, wherein the method comprises a control operation of said card including the following steps:

measuring (S10), by the card, a parameter which can evolve dynamically during card lifespan, said parameter being a physical characteristic of a hardware component embedded in the card;

generating (S20), by the card, a decision which may be positive or negative by executing a preset function applied to said parameter;

only if said decision is positive, identifying (S30), by the card, a message and presenting (S40) a piece of information to a user of the card directly through said user output interface, the piece of information signifying that the card has the message to deliver to the user, the piece of information being distinct from the message;

the card connects to a terminal comprising a man machine interface and the terminal retrieves an identifier of said message from the card and presents (S50) the message to the user through the man machine interface, the piece of information being distinct from the identifier; and wherein the card comprises a fingerprint sensor, wherein said parameter is an indicator reflecting a level of dirt of the fingerprint sensor, wherein the card generates the indicator from a captured data acquired by the fingerprint sensor and wherein the message indicates to the user that the fingerprint sensor should be cleaned.

2. The method according to claim 1, wherein the card records said indicator, wherein the fingerprint sensor acquires a new captured data, wherein the card computes a new indicator reflecting a new level of dirt of the fingerprint sensor from the new captured data, wherein the card generates a new decision which may be positive or negative by executing said preset function applied to both said indicator and said new indicator, and wherein only if said new decision is positive, the card identifies a new message (53) and notifies the user directly through said user output interface that the card has a new message to deliver to the user.

3. The method according to claim 1, wherein the card comprises a biometric reference pattern and wherein the indicator is generated each time a comparison between an image extracted from said captured data and the biometric reference pattern fails.

4. The method according to claim 1, wherein the control operation is done at each power-up of the card or is randomly triggered.

5. The method according to claim 1, wherein the card is a payment card and wherein the control operation is done each time a payment transaction occurs.

6. The method according to claim 1, wherein the user output interface is a light source, a sound generator, a display or a pictogram illuminated by an associated light source.

7. A card comprising a user output interface, wherein said card comprises a processor and instructions which cause said card to execute a control operation in which:

the card measures (S10) a parameter having a value that can evolve dynamically during card lifespan, said parameter being a physical characteristic of a hardware component embedded in the card;

the card generates (S20) a decision which may be positive or negative by executing a preset function applied to said parameter;

only if said decision is positive, the card identifies (S30) a message and presents (S40) a piece of information to a user of the card directly through said user output interface, the piece of information signifying that the card has the message to deliver to the user, the piece of information being distinct from the message;

the card sends an identifier of said message to a connected terminal, the piece of information being distinct from the identifier; and wherein the card comprises a fingerprint sensor, wherein said parameter is an indicator reflecting a level of dirt of the fingerprint sensor, wherein the card is configured to generate the indicator from a captured data (61) acquired by the fingerprint sensor and wherein the message indicates to the user that the fingerprint sensor should be cleaned.

8. The card according to claim 7, wherein the card is configured to record the indicator, wherein the fingerprint sensor is able to acquire a new captured data, wherein the card is configured to compute a new indicator reflecting a new level of dirt of the fingerprint sensor from the new captured data, wherein the card is configured to generate a new decision which may be positive or negative by executing said preset function applied to both said indicator and said new indicator, and wherein only if said new decision is positive, the card is configured to identify a new message and to notify the user directly through said user output interface that the card has a new message to deliver to the user.

9. The card according to claim 7, wherein the card comprises a biometric reference pattern and wherein the card is configured to generate the indicator each time a comparison between an image extracted from said captured data and the biometric reference pattern fails.

10. The card according to claim 7, wherein the card is a payment card and wherein the control operation is done each time a payment transaction occurs.

11. The card according to claim 7, wherein the user output interface is a light source, a sound generator, a display or a pictogram illuminated by an associated light source.

* * * * *